G. H. EVANS.
POCKET-KNIFE.

No. 174,417.  Patented March 7, 1876.

Witnesses:
Jno. R. Lifferts
W. J. Sawyer

Inventor:
Geo. H. Evans.

N. PETERS, PHOTO-LITHOGRAPHER, WASHINGTON, D. C.

UNITED STATES PATENT OFFICE.

GEORGE H. EVANS, OF BROOKLYN, NEW YORK.

IMPROVEMENT IN POCKET-KNIVES.

Specification forming part of Letters Patent No. 174,417, dated March 7, 1876; application filed January 3, 1876.

*To all whom it may concern:*

Be it known that I, GEORGE H. EVANS, of the city of Brooklyn, county of Kings and State of New York, have invented certain new and useful Improvements in Pocket-Knives; and I do hereby declare that the following is a full, clear, and exact description thereof, reference being had to the accompanying drawing, and to the letters of reference marked thereon.

In pocket or clasp knives, as usually constructed, the blades are arranged to turn upon a pivot at either extremity, and fold or clasp into the body of the handle, and a difficulty very often arises in turning them out from the handle or opening the knife.

Many ways have been devised for overcoming this difficulty, and blades slipped longitudinally from the handle have sometimes been used for this purpose; but their action has not been satisfactory. One of the objects of my invention is to remedy this difficulty. Another trouble arises in the common clasp-knife from the fact that the blade is not held rigidly in position, but can readily be forced back toward the handle, so that accidents often occur from the blade closing upon the hand holding the knife, without any intention on the part of the holder.

The improvement in the arrangement of the blade which I propose obviates this difficulty as well. The blade in this knife, instead of turning freely upon the handle is held firmly within the body of the handle, and when it is desired to open this knife the blade is slipped forth from the end of the handle through a slot arranged for the purpose, as is described in previous patents. These blades are contained within separate compartments in the handle itself. Pins projecting from the blades pass through slots in the side or edge of the handle, and by means of these pins the blades are caused to slide out from the handle into a position ready for use.

The arrangement of the spring and stop which I have invented is peculiarly well adapted to blades of this description; and I consider the broadened end of the blade, in combination with a strong lateral spring, to be an important part of my invention.

The nature of my invention is clearly shown in the accompanying drawings.

Figure 1:
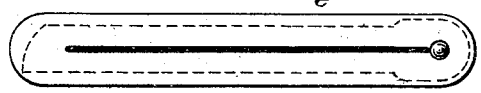
Figure 2:
Figure 3:
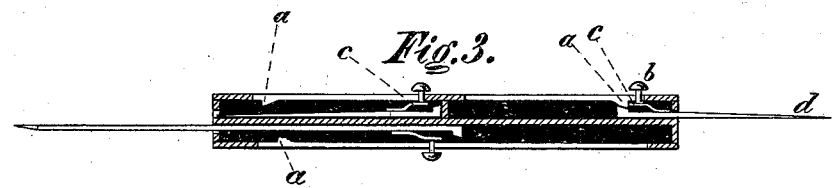
Figure 4:
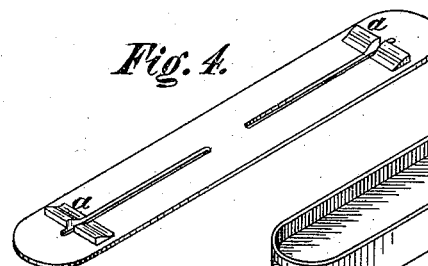
Figure 5:
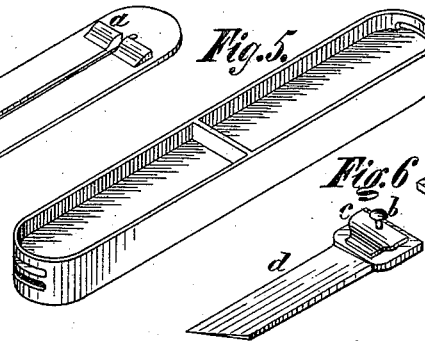
Figure 6:
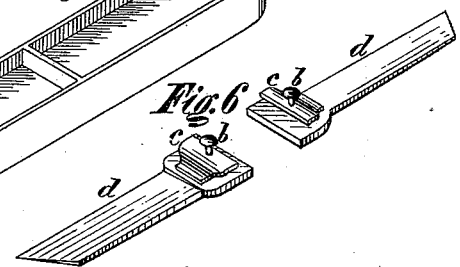
Figure 7:
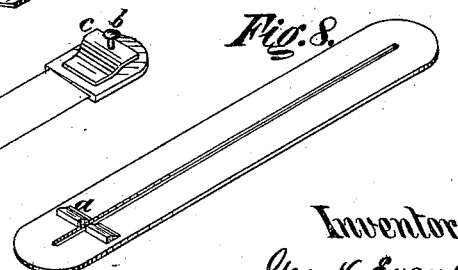
Figure 8:
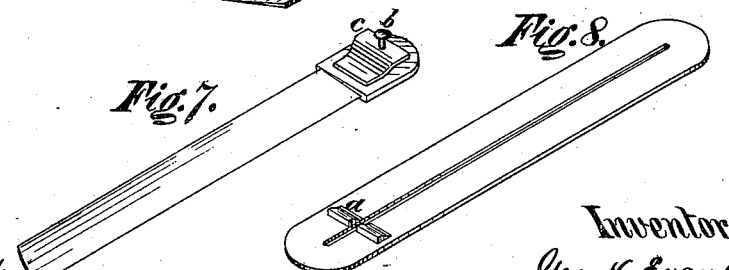

Figures 1 and 2 represent a general view of my invention; Fig. 3, a cross-section, showing the blades in the different positions; Figs. 6 and 7 represent the blades themselves with the attached pin and spring. Figs. 4, 5, and 8 represent the different portions of the handle.

The same letters in all the drawings refer to similar parts.

$a$ represents the stop spoken of; $b$, the pin; $c$, the spring, to which the pin is attached, and which bears against the stop $a$ when in position.

My invention secures a blade which can be readily slipped from the handle, ready for use, and is readily returned, and which, when in position, is firmly held from movement in any direction, and cannot by any accident be turned back upon the holding-hand.

What I claim as my invention, and desire to secure by Letters Patent, is—

1. In combination with the handle $e$, the blade $d$ with its accompanying lateral spring $c$, arranged to bear or press against the divided lateral stop $a$, in combination with the pin $b$, substantially as described.

2. A knife-blade, arranged to be slipped longitudinally from the handle, having its base thickened for the purpose of bearing against the stop $a$, and held firmly in position from motion in any direction, substantially as described.

GEO. H. EVANS.

Witnesses:
 JNO. R. LEFFERTS,
 W. J. SAWYER.